Aug. 13, 1929.   G. M. WRIGHT ET AL   1,724,246
WIRELESS RECEIVING SYSTEM
Filed May 13, 1924
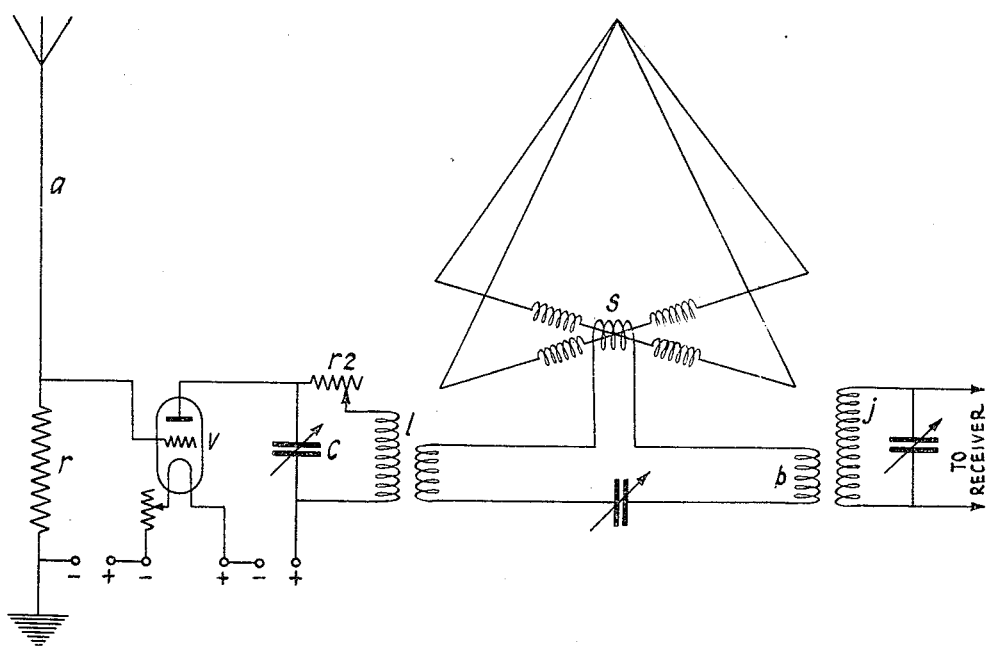
Inventor
G. M. WRIGHT AND
L. D. HILL
By their Attorney
Ira J. Adams Patented Aug. 13, 1929.

1,724,246

UNITED STATES PATENT OFFICE.

GEORGE MAURICE WRIGHT, OF CHESTERFIELD, AND LAURENCE DAVENPORT HILL, OF LONDON, ENGLAND, ASSIGNORS TO RADIO CORPORATION OF AMERICA, A CORPORATION OF DELAWARE.

WIRELESS RECEIVING SYSTEM.

Application filed May 13, 1924, Serial No. 712,958, and in Great Britain May 18, 1923.

This invention relates to wireless receiving systems of the type comprising a directional aerial and a non-directional aerial.

According to this invention we combine with one of the aerials a thermionic valve so that the currents produced by the incidence of the waves to be received on the two aerials may be made to balance and thus a cardioid polar diagram may be obtained for various wave lengths. Preferably the two ends of a resistance in the non-directional aerial are connected to the grid and filament of a valve, the plate circuit of which is coupled to a circuit containing the search coil of the directional aerial and a coil by which the circuit is coupled to a detector circuit.

The invention is illustrated by the single figure of the accompanying diagram in which $a$ is a vertical aerial which is damped by means of a series resistance $r$ of a value that will give the aerial its critical damping.

The filament and grid of a valve $v$ are connected to either end of this resistance.

In the plate circuit of the valve is connected an inductance $l$ whose impedance is small compared with the resistance of the valve and may be varied by a variable resistance $r^2$ in series with it, and by the variable condenser $c$.

The inductance $l$ is coupled magnetically to the search coil circuit of a radiogoniometer $s$. A coupling coil $b$ included in the same circuit, induces into an inductance $j$, which is connected to any suitable receiver.

For the correct operation of the device, it is necessary that the valve characteristic should be straight. This can be achieved by using either a small transmitting valve or a number of receiving valves in parallel, each having a resistance in series with its anode. It is also necessary to use a high plate voltage, with sufficient negative bias on the grid to remove any likelihood of grid current, flowing as a result of strong atmospheric disturbances.

The operation is then as follows:—

The arriving wave induces in the aerial $a$ an E. M. F. which is in phase with the electrical field in the wave, and since $a$ is damped by means of the resistance $r$, the current which flows in this aerial is also in phase with the electrical field, and hence the potential difference across $r$ is in phase.

Also, since the impedance of the anode coil is small compared with the resistance of the valve, the current in this coil is in phase with the potential difference across $r$, so that the induced E. M. F. is 90° out of phase with the electric force in the arriving wave.

In the case of the loop aerials, the E. M. F. induced is 90° out of phase with the electric force in the arriving wave, and since the impedance of the aerial is mainly inductive, the current which flows is 180° out of phase with the electric force, and it follows that the phase difference between the E. M. F. in search coil circuit and the electric force in the arriving wave is 90°.

Under these conditions it is clear that a balance can be obtained between the open and the loop aerial, resulting in the usual cardioid diagram.

The advantages gained by the use of the device are as follows:—

(1) A very wide range of wave length can be covered without material alteration in the constants of the open aerial circuit.

(2) The cardioid reception diagram can be made use of on very long wave lengths on small aerial systems.

Having described our invention, what we claim is:

1. In a wireless receiving system the combination of a crossed loop aerial, a non-directional aerial, aperiodic damping means in series with the nondirectional aerial of a value suitable for critical oscillatory periods of said aerial, a thermionic valve, an input circuit connected to said valve and one of said aerials and an output circuit connected to said valve, a variable condenser and a coil in said output circuit, said coil being in inductive relationship to a search coil circuit wherein the induced electromotive force is ninety degrees out of phase with the electromotive force in the arriving wave and means to couple the search coil circuit to the crossed loop aerial.

2. In a wireless receiving system the combination of an aperiodically damped non-directional aerial, a thermionic valve, an input circuit for said valve associated with said non-directional aerial, an output circuit for said valve having a variable resistance and a coil of small impedance, a directional aerial, a search coil circuit coupled to the output circuit of said valve and to the directional aerial and detecting means associated with the last-mentioned circuit whereby balance is obtained between the nondirectional aerial and the directional aerial.

3. In a wireless receiving system, the combination of a non-directional aerial, a resistance therein, a thermionic valve having its grid and filament connected to the resistance, an output circuit for said valve, said output circuit of said valve being of low impedance and containing resistance, a directional aerial and a search coil circuit connected to the output circuit of the valve and to the directional aerial whereby balance is obtained between the nondirectional aerial and the directional aerial.

4. In a wireless receiving system, the combination of a non-directional aerial, a resistance therein, a thermionic valve having its grid and filament connected to the resistance, an output circuit for said valve, a coil in said output circuit of the valve, a capacity in shunt with said coil, a directional aerial and a search coil circuit connected to the output circuit of the valve and to the directional aerial whereby balance is obtained between the nondirectional aerial and the directional aerial.

5. In a wireless receiving system, the combination of a directional aerial, a non-directional aerial, a thermionic valve, a grid circuit therefor connected to one of said aerials, an output circuit for said valve having a variable resistance and a capacity and a search coil circuit inductively coupled to the other aerial and to the output circuit of the valve whereby balance is obtained between the nondirectional aerial and the directional aerial.

6. In a wireless receiving system, the combination of a nondirectional aerial, a circuit associated therewith, a thermionic valve connected with said circuit, a plate circuit for said valve, a coil in said plate circuit, a separate intermediate circuit coupled to said plate circuit, a directional aerial inductively coupled to the intermediate circuit and means to couple the intermediate circuit to an indicating circuit.

7. In a wireless receiving system, the combination of a nondirectional aerial aperiodically damped, a thermionic valve connected to said aerial circuit, an anode circuit for said valve containing a variable resistance, an inductance in series with the resistance, a separate intermediate circuit inductively coupled to said inductance, a separate directional aerial nonconductively coupled to the intermediate circuit, an indicating circuit and means to couple the intermediate circuit to said indicating circuit.

8. In a wireless receiving system a non-directional antenna having a resistance therein of sufficient magnitude to render the aerial aperiodic for a large frequency range, a three element tube having its input connected to spaced points on said resistance the output circuit of said tube having an inductance therein of small impedance compared with the impedance of the output circuit whereby the induced E. M. F. is 90° out of phase with the incoming signal, a directional aerial, and a common circuit coupled to said inductance and to said directional aerial.

9. In a wireless receiving system, a non-directional antenna, aperiodic damping means in series with the non-directional aerial of a value suitable for critical oscillatory periods of said non-directional aerial a three element tube having its input connected to spaced points on said resistance, an output circuit for said tube, a variable capacity and a variable resistance in said output circuit, a loop aerial, and a search coil coupled to said loop aerial and said output circuit, whereby balance is obtained between the non-directional and loop aerial.

10. In a wireless receiving system, the combination of a non-directional aperiodic aerial, a damping resistance in series therewith, a vacuum tube amplifier, a grid and filament therefor, said grid and filament being connected to opposite ends of said damping resistance, an output circuit for said tube, a variable resistance in said output circuit, an inductance in series with said variable resistance, a variable condenser in shunt with said resistance and inductance, an intermediate circuit coupled to said inductance, a directional aerial coupled to said intermediate circuit and a receiving circuit coupled to said intermediate circuit.

11. In a wireless receiving system, the combination of a directional aerial, an aperiodically damped non-directional aerial, a thermionic valve, an input circuit for said valve connected to one of said aerials, an output circuit for said valve, said output circuit having an inductance of small impedance compared to the total impedance of said output circuit and a common circuit inductively coupled to the other aerial and to the output circuit of the thermionic valve whereby the induced electromotive force in the common circuit is 90° out of phase with the electromotive force of the arriving wave at the non-directional aerial.

12. In a wireless receiving system, the combination of a directional aerial, a non-directional aerial, aperiodic damping means in said non-directional aerial, a thermionic valve having input and an output circuits, means for connecting the input circuit of said valve with one of said aerials, phase adjusting means in said output circuit, a circuit coupled to said output circuit and to the other aerial and indicating means associated with said circuit.

13. In a wireless receiving system, the combination of a directional aerial, a non-directional aerial, damping means in said non-directional aerial, a thermionic valve having input and output elements, means for connecting said input elements to one of said aerials, an output circuit associated with said output elements, means including a resistance for adjusting the phase of the current in said output circuit and a common circuit coupled to the other aerial and the output circuit of said thermionic valve.

GEORGE MAURICE WRIGHT.
LAURENCE DAVENPORT HILL.